Oct. 1, 1935.  A. R. KNIGHT  2,016,093
ART OF REPAIRING STRUCTURAL MEMBERS
Filed May 4, 1933  3 Sheets-Sheet 1

Inventor
A. RHODES KNIGHT,
By Steward & McKay
his Attorneys

Oct. 1, 1935.  A. R. KNIGHT  2,016,093
ART OF REPAIRING STRUCTURAL MEMBERS
Filed May 4, 1933  3 Sheets-Sheet 2

Inventor
A. RHODES KNIGHT,
By Steward & McKay
his Attorneys

Oct. 1, 1935.       A. R. KNIGHT       2,016,093
ART OF REPAIRING STRUCTURAL MEMBERS
Filed May 4, 1933       3 Sheets-Sheet 3

Inventor
A. RHODES KNIGHT,

By Steward & McKay
his Attorneys

Patented Oct. 1, 1935

2,016,093

UNITED STATES PATENT OFFICE 2,016,093

ART OF REPAIRING STRUCTURAL MEMBERS

Arthur Rhodes Knight, Baltimore, Md.

Application May 4, 1933, Serial No. 669,439

14 Claims. (Cl. 29—151)

This invention relates to the art of repairing structural members, and it relates more particularly to a method of taking up wear in structural members. While its useful application is not confined thereto, the method of my invention is particularly useful for taking up slack in link or brace members of bridges and like structures.

In view of the particular usefulness of my invention in the repair of link or brace members of bridges and like structures, its operating principles and advantages will be presented in that connection, although, as stated, its useful application is not confined thereto.

A frequent cause of the failure of an iron or steel bridge of the truss type, for example, to bear or properly distribute the maximum load for which it was originally designed is the slack which occurs after long continued use in the brace or link members of the type extending between opposite attaching pins as continuous bars and which take part in distributing the load and the impulsive forces of traffic from point to point through the bridge structure to its foundation supports. This slack is generally due either to a permanent stretch of the metal brace or link members beyond their original length for their designed maximum load or to wear of their eye portions upon their attaching pins in the bridge structure. In either case there is a slack in the member between the attaching bolts at its opposite extremities which prevents the member from assuming and properly distributing its full share of the load.

While both of the last-mentioned causes may be operative in producing the slack in the brace or link members of the bridge, the wear of the eye portions of the member on its attaching pins or bolts is generally not sufficient to require the substitution of a new member provided the slack in the old member can be taken up in a manner restoring it not only to its original length but also substantially to its original load-bearing strength.

A general object of my invention is the provision of a method for the foregoing restitution or repair of the old link or brace members while in position in the bridge or other structure and with a minimum cost for labor and materials and no interruptions to traffic.

Another object of my invention is to facilitate the repair of a bridge or like structure where the repair requires the insertion of a new link or brace member. For example, in an old bridge structure where sagging of some part has occurred due to a permanent elongation of a link bar between its opposite anchoring bolts and the member is so weakened as to make it necessary to substitute a new one, if the new member is initially of exactly the required length the sagged portion of the bridge structure must in most instances be jacked up for its insertion. Moreover, it is sometimes difficult, if not impossible, to determine the exact length of new member required unless the sagged portion of the structure in which the member is to be inserted is first jacked up, and all this not only increases the time and expense of the repair but generally also closes the bridge to traffic. My invention aims to avoid these difficulties in the repair of a bridge or the like structure by providing a method of adjustably shortening the length and securely maintaining the adjusted length of the brace or link member after its insertion in the structure undergoing repair, so that the exact length need not be determined beforehand and the sagged portion of the bridge jacked up to accommodate it.

I am aware of prior art devices and methods for adjustably shortening or taking up the slack in brace or link members of the continuous solid bar type in bridges or like structures while those members are in position in the structure. But, so far as I am aware, all such devices and methods of their use involve manually operable adjusting devices of the screwthread type, generally with a turnbuckle for the adjustment, secured on opposite sides to the bar member at points spaced along its length, so that when the bar is cut through between the points of securement of the adjusting devices and the slack taken up the screw-threaded adjusting devices, with their turnbuckles, function as the permanent connecting links between the severed ends of the bar and must stand the tensile strain. Such devices and methods present several disadvantages. One in particular is that the connecting links between the severed ends of the bar formed by the screw-thread devices with their turnbuckles are generally of a tensile or load-bearing strength substantially less than that of the original bar member itself, so that the repair does not restore the previous load-bearing capacity as contemplated by my invention.

Another disadvantage in the prior art devices and methods is that the taking up of the slack through a manually operated screw-thread device is a difficult operation against any heavy load on the bar, such, for example, as a sagging portion of the structure to which the bar is attached Unless the sagging part is jacked up the slack in the link or brace member is not completely taken up and that member restored to its original length designed for its share of the load. Still another disadvantage is that the adjustment is a haphazard or blind one since the customary use of a manually operable screw-thread device on opposite sides of the severed bar does not ensure a balanced adjustment nor give any reliable indications as to the extent of the adjustment or the resulting strain on the bar.

Accordingly, a particular object of my invention is to provide a method of repair of structural members which is especially adapted for taking up the slack in brace or link members of the bar type in a bridge or the like and which is free from the foregoing disadvantages of the prior art devices and methods.

For such repair, my invention, generally stated, contemplates connecting two abutment members to the structural member undergoing repair, a link bar in a bridge, for example, so as to dispose the abutments on opposite sides of the intended line of cut through the bar, with at least one of these abutment members in the form of a plate extending from the point of attachment to the bar freely over the intended line of cut through the bar. A length-adjusting device is placed between or connected to the abutments and the bar is severed, the cut usually, but not always, being made after the length-adjusting device is in position, especially if the bar is under tension. The length-adjusting device is then used on the abutments to draw the severed ends of the bar toward each other to the extent required to take up the slack, and the theretofore unattached end of the plate is secured to the bar on the side of the cut opposite to the initial point of attachment. Thereafter that member functions solely as a splice plate to reinforce the bar and maintain its adjusted length.

The foregoing and other objects and principles of my invention as well as its advantages in the practical art will more fully appear from the presentation hereinafter made by description and drawings of a preferred method of procedure and devices used for the practice of the invention.

In the accompanying drawings illustrating the preferred method of procedure and devices used in the practice of the invention, Fig. 1 is a side elevation of a take-up connection applied to a brace or link member of the bar type in a bridge, to illustrate the application of my invention in the repair of such a structural member;

Fig. 2 is a top plan or edge view of the take-up connection and visible portion of the link member shown in Fig. 1;

Figs. 3 and 4 are transverse cross-sectional views respectively on the lines 3—3 and 4—4 of Fig. 1, looking in the direction of the arrows on the last-mentioned figure;

Figure 1:
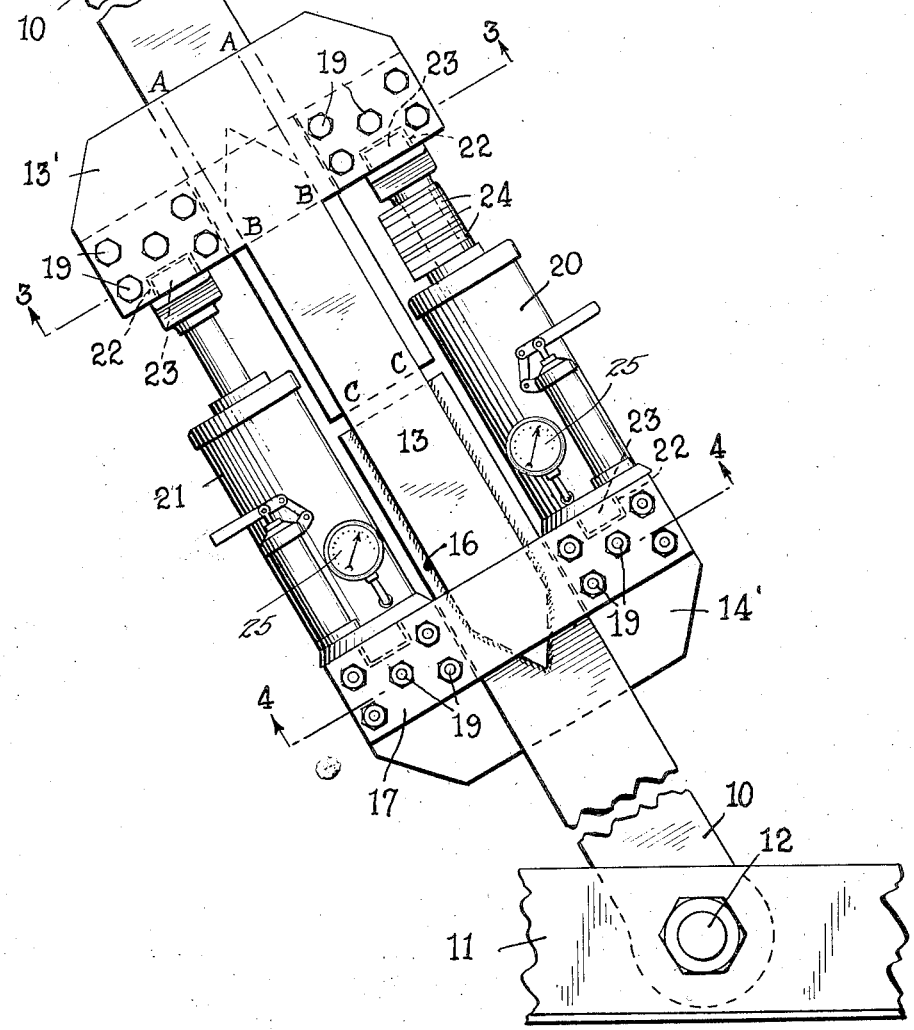

The brace or link member of a bridge structure, to the repair of which my invention is applied in the illustrative example, is indicated by the numeral 10 in all views of the drawings, a portion only of top and bottom side rails of the bridge being shown at 11 in Fig. 1, to which side rails the opposite terminal eye-portions of the link member are attached or anchored by bolts 12.

As already stated, the condition of the link member for which the repair contemplated by my invention is required is a slack or elongation of the link bar beyond its original length between its attached terminals due either to wear on its eye portions or a permanent stretch of the bar or to both causes. Or, the link bar may be a newly inserted one in the bridge structure but too long to take and properly distribute its share of the load. In either case, the solid bar must be severed intermediate its attached terminals, the slack or extra length taken up and the member as a whole restored to substantially its original load-bearing strength to render the repair effective and thoroughly satisfactory. This, my invention is designed to do while the structural member is in place.

In the preferred practice of the invention, two plates are used, one for each of the opposite faces of the link bar, with one plate secured at one end to the bar on one side of the intended line of cut through the bar and the other plate secured at one end to the bar on the opposite side of the intended line of cut, and with each plate having its other end portion unattached to the bar, overlapping the intended line of cut and terminating in an abutment head so as to dispose the points of securement of the plates to the link bar as well as the abutment heads of the plates in opposed relation on opposite sides of the intended line of cut through the bar. A length-adjusting device of the extension type, such as a jack, is then mounted between the abutment heads of the splice plates, the link bar severed, the adjusting device expanded against the opposed abutment heads so as to draw the severed ends of the link bar toward each other and thereby take up the slack, after which the theretofore free portions of the plates are welded or otherwise secured to the link bar to maintain its adjusted length and reinforce the bar over the line of cut. The plates therefore initially function as abutment members of a length-adjusting device and finally as splice plates.

Each plate is initially of T form, as shown at 13 in Fig. 1 for the plate exposed to view on one side of the link bar 10, the cross part 13' of the T forming the abutment head referred to above. A portion of the opposed abutment head of the plate on the opposite face of the link bar is shown at 14' in Fig. 1. Both plates 13 and 14 on opposite sides of the link bar appear in full top edge view in Fig. 5 and are indicated in dotted lines in Fig. 2 while their stem ends appear in Figs. 3 and 4. The abutment heads 13' and 14' of these plates are also shown in transverse cross-sectional view in Figs. 3 and 4.

Figure 5:
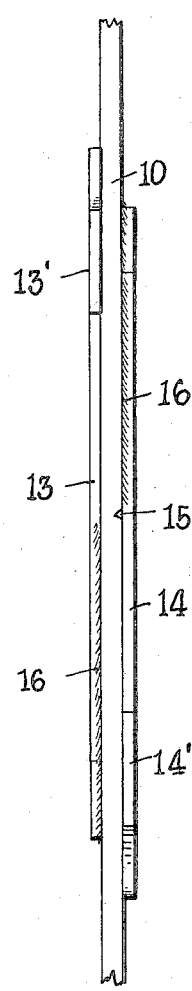
Fig. 5 is a top edge view of the link member with only certain parts of the take-up connection applied thereto, so as to more clearly illustrate certain steps of the method of my invention.

Fig. 5, which is a top plan or edge view of the link bar undergoing repair and the plates applied thereto, illustrates the initial steps of the procedure. A V-shaped notch or groove is preferably first cut across one of the faces of the link bar 10, as indicated at 15, primarily for the purpose of providing outlet passages for the combustion gases as the cutting torch is applied in the process of severing the bar along the lines of cut. If desired the grooves may be cut in the plates 13 or 14, but with the disadvantage of a slight although not substantial weakening of their tensile strength as splice plates, or instead the waste gas outlet may be provided by drilling a hole through the link bar from its top to its bottom edge face.

The preferable procedure, however, is to groove one of the side faces of the link bar as shown in Fig. 5.

The T plates 13 and 14 are then temporarily clamped to the opposite side faces of the link bar, preferably in substantially the relative positions shown in Fig. 5 with their abutment heads spaced apart on opposite sides of the intended line of cut through the bar and the stem portion of each plate extending across the intended line of cut and also preferably overlapping a portion of the abutment head of the opposite plate. The plates are then welded in these positions to the link bar for a distance extending from the stem end of each plate approximately up to but not overlapping the intended line of cut, so as to dispose the points of attachment of one plate to the bar entirely on one side of the intended line of cut and the points of attachment of the other plate entirely on the opposite side of the intended line of cut, as indicated by the bead welds 16 in Fig. 5. As shown for the plate 13 in Fig. 1, the stem portion of each plate is made sufficiently narrower than the link bar to provide marginal space for a secure bead weld. A one-half inch bead weld is generally amply sufficient, and the length varies with the load applied. The end of the stem portion of each plate can be tapered, rounded or pointed, and/or the cross portions or abutment heads of plates 13 and 14 can be provided with extensions in alinement with the stem portions, if desired, in order to provide additional surface or joint space for welding.

With the plates of the form and manner of attachment to the link bar shown in Figs. 1 and 5, and with the link bar then severed between the points of attachment of the plates thereto, it is obvious that any force applied to the abutment heads in a manner to spread them apart will draw the severed ends of the bar toward each other and thereby take up the slack in the bar. The required force can most conveniently be applied by a length-adjusting device of the expansion type mounted between and operating against the opposed abutment heads of the splice plates to spread them apart. While any suitable length-adjusting device of that or any other type which will force the abutment heads of the plates apart may be employed, my invention more particularly designs the use of a hydraulic jack because of the ease with which adjustments in length can be made therewith and because of its great expansion power and still more particularly a hydraulic jack equipped with a pressure gauge marked and calibrated to register the expansive force in pounds per square inch as this in effect gives the stress or load on the plates as the slack in the link bar is being taken up.

Figure 2:
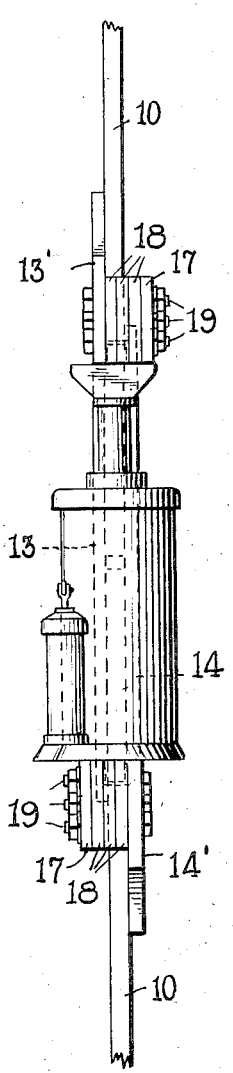
Figure 3:
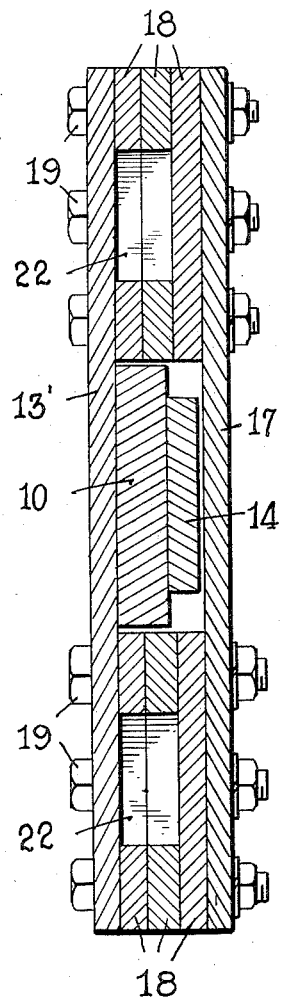
Figure 4:
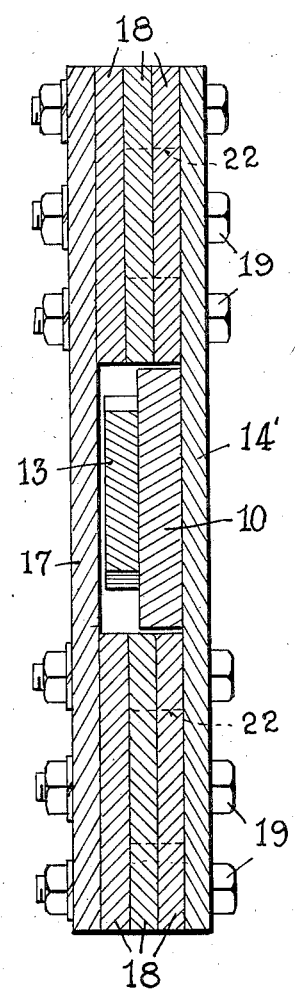

Two such jacks are used, and for greater security of their mounting between the abutment heads of the plates and greater smoothness and reliability of function of the take-up connection as a whole, certain accessory devices in the nature of side and spacing blocks or plates are preferably employed. These blocks, preferably of metal, are in two sets temporarily bolted to the abutment heads 13', 14' of the plates 13, 14 after those plates have been secured to the link bar as shown in Fig. 5 and before the bar is severed. Each set comprises an outer side block 17 on the side of the link bar 10 opposite the abutment head of the plate to which it is bolted and a plurality of spacing or filler blocks 18 above and below the link bar 10 to span the edge width of that bar and the edge width of the stem-end portion of the opposite plate, as shown in Figs. 2, 3, and 4. A plurality of thin filler blocks are provided simply to accommodate the equipment to link bars of differing thickness, and in the illustrative example three of the filler blocks 18 above and below the link bar are sufficient to slightly overspan the edge width of both the link bar and the stem-end portion of the side plate which overlaps the abutment head to which the blocks are bolted.

As also shown, the bolts 19 which secure each set of side and filler blocks to the abutment head of one plate do not pass through the link bar or the other plate. With the parts thus arranged, when the link bar is severed the severed ends and the stem-end portions of the plates attached thereto are free to move in the rectangular openings shown in Figs. 3 and 4 as bounded by the abutment heads of the plates, and the filler and side blocks. In other words, viewing Figs. 3 and 5 on this matter and assuming that the link bar 10 has been severed, the stem-end portion of the plate 14 and the severed end of the link bar to which it is attached are free to slide longitudinally in the opening shown in Fig. 3 as bounded by the abutment head 13' of the plate 13 and the filler and side blocks bolted thereto. Likewise, viewing Figs. 4 and 5 on this matter, the stem-end portion of the plate 13 and the severed end of the link bar to which it is attached are free to slide longitudinally in the opening shown in Fig. 4 as bounded by the abutment head 14' of the plate 14 and the filler and side blocks bolted thereto. Thus the abutment head of each of the plates 13 and 14 and the set of filler and side blocks bolted thereto not only provide a wide abutment face for the mounting and operation of the jacks parallel to the link bar but also form guides for the stem-end portion of the opposite plate and the severed end of the link bar to which it is attached, ensuring positive alinement of the opposite severed ends of the link bar and preventing side play and swing in the movement of the link bar and attached side plates in taking up the slack, features of considerable practical advantage in the repair of a long link bar in a bridge structure where the bar has to be severed intermediate its ends.

Two hydraulic jacks are employed between the abutments, one above and the other below the link bar, as indicated at 20 and 21 in Fig. 1, the uppermost jack 20 alone appearing in the top plan view of Fig. 2. In order to more securely mount these jacks in proper position and yet provide for their ready removal, the filler blocks 18 are so formed as to present rectangular recesses in their faces above and below the link bar as indicated at 22 in Figs. 3 and 4, and rectangular lugs 23, welded on the base and head of each jack, are formed to enter those recesses. The recesses are so spaced from the link bar as to center the jacks in positions sufficiently above and below the bar to allow ample room between the jacks and the bar for the operation of a cutting torch in severing the bar. As shown in dotted lines in Fig. 1, the lugs 23 on the base and head of the jacks sufficiently fit into the recesses 22 in the filler blocks of the abutments to properly position the jacks but a slight clearance is left between the base of the lugs and the base of the recesses so as to cause the pressure force of the jacks to operate entirely by direct contact of the broad base and head of each jack against the broad face of the abutments instead of in whole or in part through engagement of the lugs against the bases of the recesses in the filler blocks.

Figure 7:
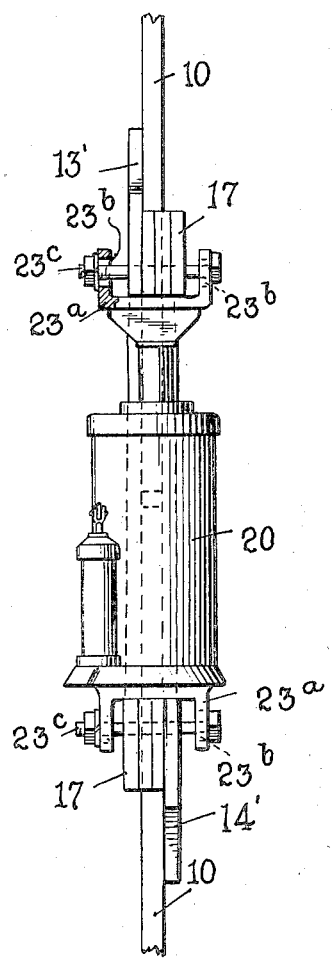
Fig. 7 is a view similar to Fig. 2 showing another way of mounting the jacks.

Another way of mounting or securing the jacks in position is illustrated in Fig. 7, in which the base and head of each jack are provided with spaced lugs or U-shaped brackets 23ª adapted to embrace the abutment heads and the filler and side blocks secured thereto, said brackets being provided with holes or slots 23ᵇ to receive bolts 23ᶜ by which the jacks can be secured or connected to said abutment heads and the filler and side blocks secured thereto. In this form of mounting, the jacks are securely attached or positively held in place at all times and accidental separation of the abutment heads and/or displacement of the jacks is prevented.

As the jacks are expanded, spacing rings or spacers, shown at 24 on Fig. 1 for the uppermost jack only, and omitted in the top plan view of Figs. 2 and 7 for the sake of clearness in showing the jack, are forced over the plunger between the annular front edge of the cylinder and the head of each jack to hold the jacks in expanded position even if the jacks should otherwise fail due to the packing blowing out or other causes.

Because of the heavy pressures developed, lead or other metal spreadably fluent under pressure is used between the base and head of the jacks and the opposed abutments to fill up any depressions in the abutment faces and thus give an even or equalized bearing surface for the jacks.

Each jack is provided with a pressure gauge 25 registering, as already stated, in pounds per square inch of the pressure exerted on the opposite abutments and therefore giving a direct reading of the stress or load on the take-up connection as a whole, including the side plates 13 and 14 and the link bar 10 as the slack in the link bar is taken up. This is a feature giving many practical advantages in the practice of the invention. With the two jacks oppositely disposed with respect to the link bar and the pressure gauges giving a direct reading in pounds per square inch of the stress or load on the plates and on the link bar through the welding connections between them, the strength of the initial welding connections shown at 16 in Fig. 5 can be tested before the bar is severed and any deficiency or lack of uniformity in strength of those welding connections discovered and corrected. Also, after the link bar is severed, the two jacks can be kept in balanced operation and consequently the opposite side plates 13 and 14 maintained under even tension throughout the take-up of the slack by comparing the gauge readings on the two jacks and operating them accordingly, so that when the slack is finally entirely taken up an even load on the side plates and their weld connections with the link bar is ensured. Moreover, knowing the maximum load which the link bar should bear when the repair is completed, the pressure gauge readings provide a ready means of exactly adjusting the extent of the take-up in the link bar to sustain that load and avoid either an over or an under take-up and tension on the repaired link-bar; thus avoiding a blind or haphazard take-up hereinbefore referred to as one of the disadvantages of prior art devices and methods used for making repairs of this nature in structural members.

Another important practical advantage of hydraulic jacks when used with the abutment devices and their connections to the link bar above described, is that in most cases sufficient power may be exerted to take up the slack in the link bar against the load of a sagging portion of the bridge or like structure to which the bar is attached, so that the sagging portion of the structure need not be first jacked up, as is generally required in the prior art methods of repair as hereinbefore noted.

The entire procedure as to the preferred mode of practicing the invention may now be briefly summarized. As already stated, Fig. 5 illustrates the initial steps. A V-shaped groove is cut across a side face of the link bar as indicated at 15 in that view. The plates 13 and 14 are then applied to the opposite side faces of the link bar with their abutment heads spaced apart on opposite sides of the intended line of cut through the bar and the stem portions of each plate extending across the intended line of cut and along the bar to overlap the abutment head of the opposite plate. The plates while held in those positions by any suitable temporary holding means, such as clamps, are then welded to the bar for a distance extending from the stem end of each plate approximately up to but not overlapping the intended line of cut through the bar, as indicated by the bead welds 16 in Fig. 5, so as to dispose the points of securement of the plates at spaced points on opposite sides of the intended line of cut and with the free end of each plate (that is, the end unattached to the link bar) overlapping the attached end of the other plate.

The filler and side blocks are then bolted to the abutment heads of the plates 13 and 14 as shown in Figs. 1 to 4 inclusive to provide broader abutment faces than afforded by the abutment heads of the plates alone as well as to secure the bar from swing and side play after it is severed, and the jacks are mounted between these abutments as shown in Figs. 1 and 2.

The initial welding connections between the stem-end portions of the plates and the link bar shown at 16 in Fig. 5 are then tested as to strength by a preliminary expansion of the jacks against the opposite abutments tending to spread them apart. If those welding connections are found to be satisfactory, a cutting torch is applied to the link bar and that bar cut through along the intended lines of cut, the waste gases escaping along the groove in the side face of the bar. The cut, of course, will be made of a width amply sufficient to cover the slack in the link bar; in other words, amply sufficient to shorten the bar to the required extent.

The jacks are then expanded as illustrated in Fig. 1 against the abutments on the plates so as to spread the abutments apart and thereby, through the connections shown in Fig. 5 between the stem-end portions of these plates and the link bar, to draw the severed ends of the bar toward each other and consequently take up the slack therein.

Figure 6:
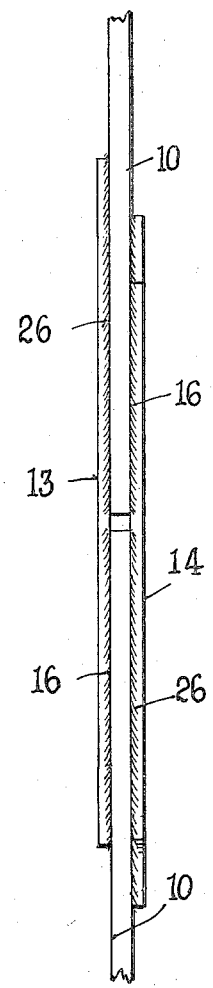
Fig. 6 is a top plan or edge view of the finally adjusted and repaired structural member.

After the length adjustment of the link bar has thus been completed and before the jacks are retracted, the portions of the plates between their abutment heads and the cut through the link bar, which were theretofore unattached to the link bar as shown in Figs. 1 and 5, are bead welded to that bar. In other words, the second bead welds, identical in character with the initial bead welds 16 shown in Figs. 1 and 5, extend along the top and bottom edges of the side plates between the points B and C shown for the side plate exposed to view in Fig. 1. The jack may then be further operated to test the strength of the new bead welds. With the new bead welds found to be of the required strength, the jacks and the filler and side blocks are removed, and each side plate is then cut through along the lines indicated by the dotted lines AB, for the plate exposed to view in Fig. 1. This leaves the side plates of uniform width throughout to function thereafter solely as splice plates in reinforcing the bar and maintaining its adjusted length. Preferably also, the bead welding is extended to the theretofore unwelded ends of the plates after the wing portions at those ends have been removed. This presents the severed and length-adjusted link bar, the splice plates and their entire welding connections to the bar as shown in the top plan or edge view of Fig. 6, in which the initial bead welds are indicated at 16 as before and the subsequent and final bead welds at 26.

Instead of attaching the splice plates to the link bar by welding any other suitable attaching means, such as bolts or rivets, may be employed, but welding is preferred.

From the foregoing, it is to be noted that the plate members 13 and 14, in their initial form and initial attachment to the link bar as shown in Fig. 5, are simply abutment members attached to the bar at spaced points on opposite sides of the intended line of cut through the bar and with each presenting an unattached end portion overlapping the other member as also shown in that view so that when the bar is severed the jacks may operate through these members to draw the severed ends of the bar toward each other and thereby take up the slack. It is only after the slack has been taken up, the abutment heads on these members cut off and the portions of these members theretofore unattached to the bar have been welded to the bar as indicated at 26 in Fig. 6 that they function as splice plates.

While the principles of my invention, both as to methods and devices employed, have been described as applied to a bridge structure, the procedural and structural principles of the invention are not confined thereto but may be applied to and embodied in other organized structures requiring like repair of their structural members. It is therefore to be understood that the example given of the practice of the invention is merely illustrative of the principles thereof, and that other methods and devices may be included in those principles within the scope of the appended claims.

What is claimed is:

1. A method of shortening a structural member while in place between points of attachment in an organized structure, said method comprising employing two abutment members of which one is an elongated member fitting throughout its length against said structural member longitudinally thereof and adapted to form a rigid splicing element, so connecting said two abutment members to said structural member at spaced points in its free extent that the one of said abutment members which is disposed throughout its length in contact with said structural member presents one end portion attached to said structural member and the other end portion unattached thereto and extending along the same toward the point of connection therewith of the other abutment member, severing said structural member in a region thereof between said spaced points overlapped by said unattached end portion of said one abutment member, applying a length-adjusting device to said abutment members in a manner to bring the severed ends of the structural member toward each other and then so connecting said unattached end portion of said one abutment member to said structural member on the side of the cut therein opposite the initial point of attachment of said one abutment member therewith as to form through said one abutment member as a rigid splicing element a structural connection independent of said length-adjusting device between the severed and drawn-up ends of said structural member functioning to secure said severed ends and maintain the adjusted length of the structural member.

2. A method of shortening a structural member while in place between points of attachment in an organized structure, said method comprising employing two abutment members of which one is an elongated member fitting against said structural member longitudinally thereof and adapted to form a rigid splicing element, so connecting said two abutment members to said structural member at spaced points in its free extent that the one of said abutment members which is disposed throughout its length in contact with said structural member presents one end portion attached to said structural member and the other end portion unattached thereto and overlapping the other abutment member in the region of the attachment of said other abutment member to said structural member, placing a length-adjusting device between said unattached end of said one abutment member and the other abutment member, severing the structural member between said spaced points, operating said length-adjusting device to bring the severed ends of said structural member toward each other and so connecting said unattached end of said one abutment member to said structural member as to form through said one abutment member as a rigid splicing element a structural connection independent of said length-adjusting device between the severed and drawn-up ends of said structural member functioning to hold said severed ends together and maintain the adjusted length of said structural member.

3. A method of shortening a structural member as defined in claim 2 further characterized by using as the adjusting device an hydraulic jack equipped with a gauge indicating the pressure force of said jack against said abutment members in pounds per square inch.

4. A method of shortening a structural member while in place between points of attachment in an organized structure comprising employing two abutment members each presenting an elongated rigid body formed on one side thereof at its opposite end portions to fit against said structural member longitudinally thereof and adapted to be utilized as a rigid splicing element and so connecting said two abutment members each at one end portion only to said structural member at spaced points in its free extent that each abutment member presents an unattached end overlapping the attached end of the other abutment member, placing a length-adjusting device between said unattached ends of said abutment members, severing the structural member between said spaced points, operating the adjusting device to bring the severed ends of the structural member toward each other and so connecting the unattached ends of said abutment members to said structural member as to form through said abutment members two structural connections independent of said length-adjusting device between the severed and drawn-up ends of said structural member functioning to hold said severed ends together and maintain the adjusted length of said structural member.

5. A method of shortening a structural member of the bar type having flat faces while in place between points of attachment in an organized structure comprising employing an elongated plate having one face throughout the length of the plate adapted to fit against a face of said structural member and an abutment out of the plane of said face and spaced from one end of said plate and so attaching said plate at its said one end directly to one face of said structural member at a point in its free extent as to dispose the other end portion of said plate bearing said abutment along said structural member in unattached relation thereto but with said one face of said plate in contact throughout its extent with said structural member attaching another abutment-bearing element to another face of said structural member at a point so spaced along said structural member from the abutment on said plate that an unattached portion of said plate overlaps a portion of the structural member between the two abutments, applying an expansion adjusting device between said abutments, severing the structural member in said portion thereof overlapped by said plate, operating said expansion adjusting device to draw the severed ends of the structural member toward each other, and then so attaching the theretofore unattached portion of said plate to said structural member on the side of the cut therein opposite the initially attached end of said plate as to form through said plate a structural connection independent of said length-adjusting device between the severed and drawn-up ends of said structural member.

6. A method of shortening a structural member as defined in claim 5 further characterized by using as said adjusting device an hydraulic jack equipped with a gauge indicating the pressure force of said jack on said abutments in pounds per square inch.

7. A method of shortening a structural member while in place between points of attachment in an organized structure comprising employing two elongated abutment members each of dimensions and form adapted to fit throughout its length against said structural member longitudinally thereof and to be utilized as a rigid splicing element and so attaching said two abutment members each along a portion at one end only to opposite faces of the structural member at longitudinally spaced points in its free extent and with the unattached ends of said abutment members pointing in opposite directions that said abutment members present unattached portions in overlapping relation on said opposite faces of said structural member, applying a length-adjusting device to said abutment members, severing said structural member in the region of said overlap, operating said length-adjusting device to draw the severed ends of said structural member toward each other, and then so attaching the theretofore unattached portion of each abutment member to said structural member on the side of the cut therein opposite to the points of initial attachment of the abutment member thereto as to form through said abutment members two structural connections independent of said length-adjusting device between the severed and drawn-up ends of said structural member.

8. A method of shortening a structural member while in place between points of attachment in an organized structure comprising employing two plates each having an abutment adjacent one end and so welding the two plates, each only at its other end, to opposite faces of the structural member at longitudinally spaced points in its free extent as to disposed unattached portions of the plates in overlapping relation in a region of the structural member between their attached portions and the abutments spaced apart longitudinally of the structural member on opposite sides of said region of overlap, applying an expansion device between said abutments, severing the structural member in said region of overlap, operating said expansion device between said abutments to spread them apart and thereby draw the severed ends of the structural member toward each other, and then so welding the theretofore unattached portion of each plate to the structural member on the side of the cut therein opposite to the initially attached end of the plate as to form through said plates two structural connections independent of said expansion device between the severed and drawn-up ends of said structural member.

9. A method of shortening a structural member as defined in claim 8 further characterized by using as said expansion device an hydraulic jack equipped with a gauge indicating the pressure force of the jack on the abutments in pounds per square inch.

10. A method of shortening a structural member of the bar type while in place between points of attachment in an organized structure comprising employing two elongated plates each equipped with two abutment elements one projecting laterally from each of the opposite edges of the plate at one end thereof, and so attaching the two plates, each only along the end portion opposite the abutments, to opposite side faces of the structural member at longitudinally spaced points in its free extent as to dispose unattached portions of both plates overlapping a common region of the structural member lying between the attached portions of the plates and to dispose the two abutment elements of each plate projecting laterally beyond the side edges of the structural member and the pairs of abutment elements spaced apart longitudinally of the structural member on opposite sides of the region of said overlap, mounting hydraulic jacks equipped with gauges indicating the pressure in pounds per square inch between the opposed pairs of abutments adjacent the opposite side edges of the structural member, severing the structural member in the region of said overlap, expanding the jacks to spread the opposed abutments apart and thereby bring the severed ends of the structural member together, then attaching the theretofore unattached portion of each plate to the structural member on the side of the cut therein opposite to the initial point of attachment of the plate thereto.

11. A method of shortening a structural member as defined in claim 10 further characterized by removing the jacks from their applied positions between the opposed abutment elements and then cutting off said elements from the plates.

12. A method of repairing a link bar in a bridge or like structure involving a severing of the bar between its attached ends and a shortening of the bar which comprises so attaching two T-shaped plates by welding end portions only of their stems to opposite sides of the bar at points spaced apart along the length of the bar as to dispose unattached portions of the stems of both plates overlapping a region of the bar lying between attached portions of the plates and the heads of the plates spaced apart longitudinally of the bar on opposite sides of said region of overlap and the stem end of each plate overlapping the head of the other plate, attaching spacer and side blocks to the head of each plate in a manner of attachment and with a form of blocks providing broad abutment faces outwardly adjacent the opposite side edges of said bar and preventing swing and side play of the bar and the attached stem end portions of the plates while permitting longitudinal movement of the parts of said bar when severed and of the plates attached thereto, mounting hydraulic jacks equipped with gauges reading in pounds of pressure per square inch between the opposed abutment faces above and below said bar, severing said bar in said region of overlap, expanding the jacks to draw the severed ends of the bar toward each other, welding the theretofore unattached portion of each plate to the bar on the side of the cut opposite to the initial welding, removing said jacks and blocks, cutting off the wing portions of the T head of the plates and completing the welding to said bar of any theretofore unwelded portions of said plates.

13. A method of shortening a structural member while it is under stress comprising employing two abutment members each presenting an elongated rigid body formed to fit throughout its length against said structural member longitudinally thereof and to be utilized as a rigid splicing element and so connecting said abutment members to said structural member at spaced points that each of said abutment members is attached at one end to said structural member and unattached at the other end, the unattached ends extend in opposite directions and the attached end of one abutment member overlaps the unattached end of the other abutment member, attaching a length-adjusting device to the unattached ends of said abutment members, expanding said length-adjusting device to carry the desired load, severing the structural member between said spaced points in a region overlapped by the unattached portion of said other abutment member, further expanding said length-adjusting device to bring the severed ends of the structural member toward each other, and so attaching the unattached ends of said abutment members to said structural member as to form through said abutment members a structural connection independent of said length-adjusting device between the severed and drawn-up ends of said structural member functioning to hold the severed ends in adjusted position.

14. A method of shortening a structural member while in place in an organized structure comprising employing an elongated rigid element adapted to be used as a splicing element and having one face throughout the length of the element formed to fit against said structural member longitudinally thereof and a lug on another face spaced from one end of said element, and so attaching said element at its said one end to said structural member in its free extent as to dispose the other end portion of said element bearing said lug along said structural member in unattached relation thereto, but with said one face of said element in contact throughout with said structural member, attaching another lug-bearing element to said structural member at a point so spaced along the structural member from the lug on said first-mentioned element that an unattached portion of said first-mentioned element overlaps a portion of said structural member between said lugs, severing the structural member in its said overlapped portion, applying a length-adjusting device to said lugs to draw the severed ends of the structural member toward each other, and then so attaching the theretofore unattached portion of said first-mentioned element to said structural member on the side of the cut therein opposite the initially attached end of said first-mentioned element as to form through said first-mentioned element a structural connection independent of said length-adjusting device between the severed and drawn-up ends of said structural member.

A. RHODES KNIGHT.